A. T. DAWSON & G. T. BUCKHAM.
BREECH LOADING ORDNANCE.
APPLICATION FILED JULY 20, 1911.
1,072,435.
Patented Sept. 9, 1913.
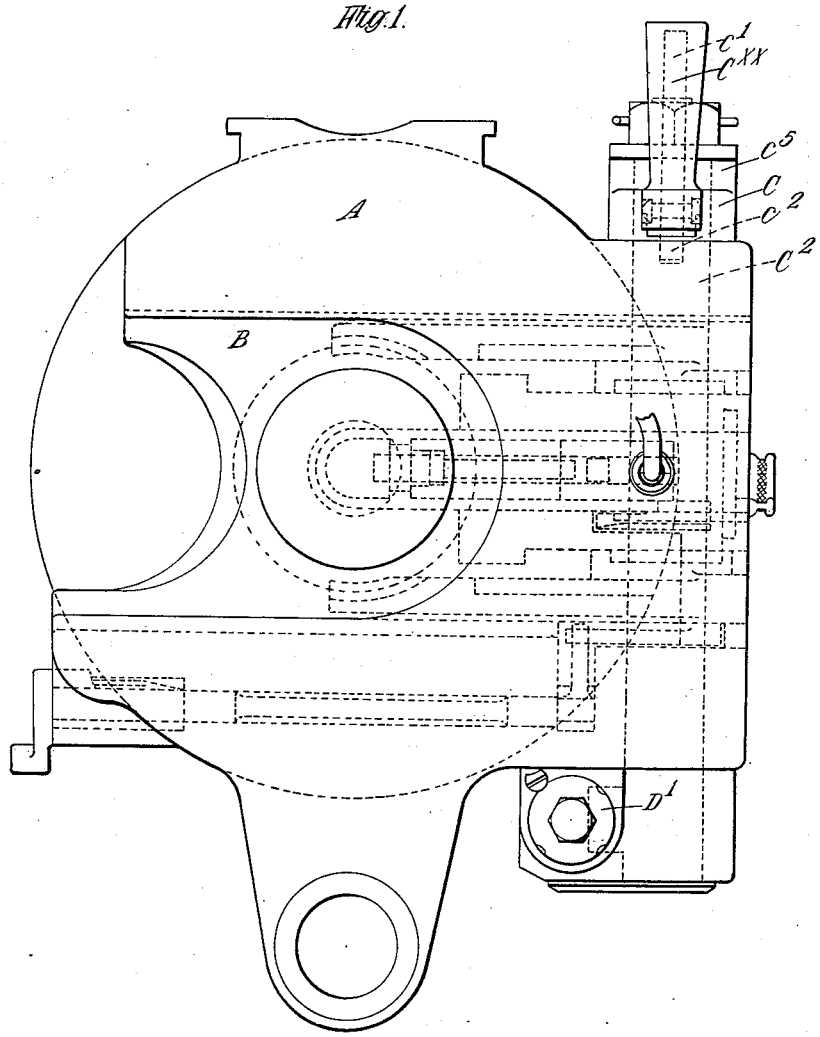

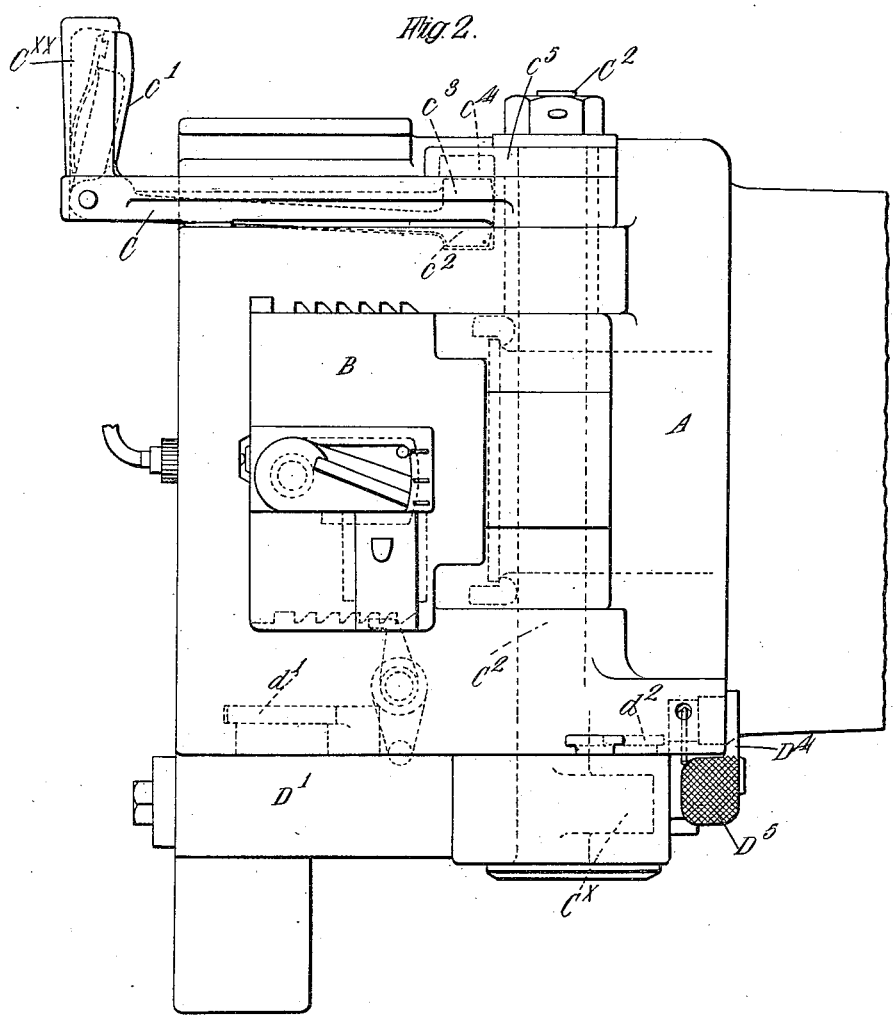

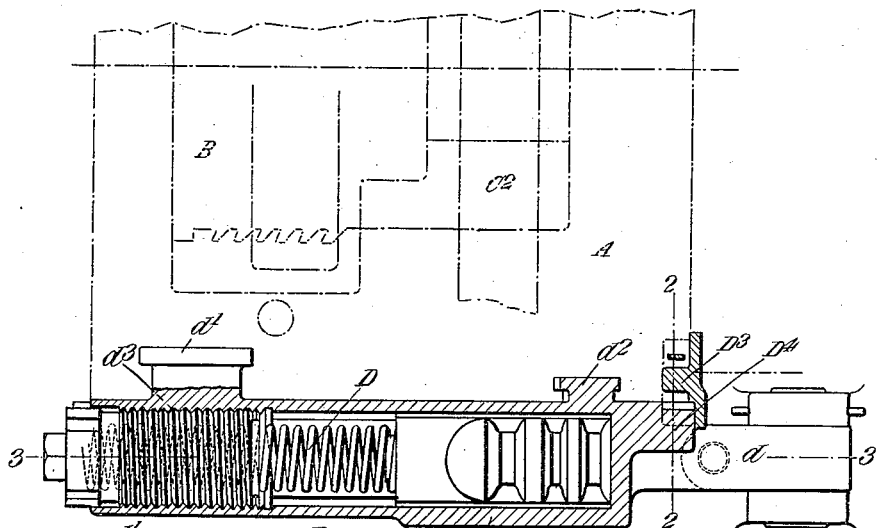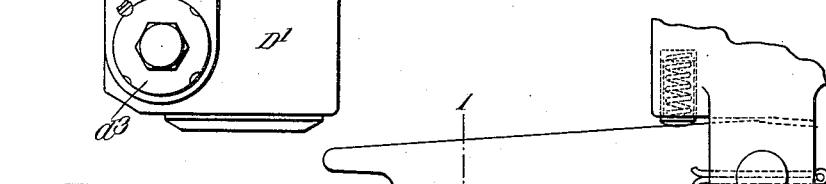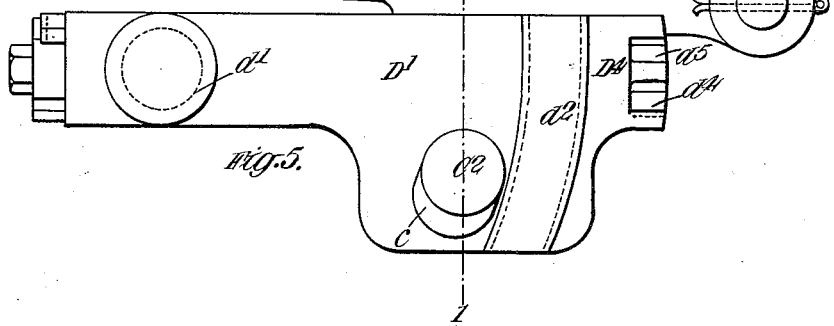

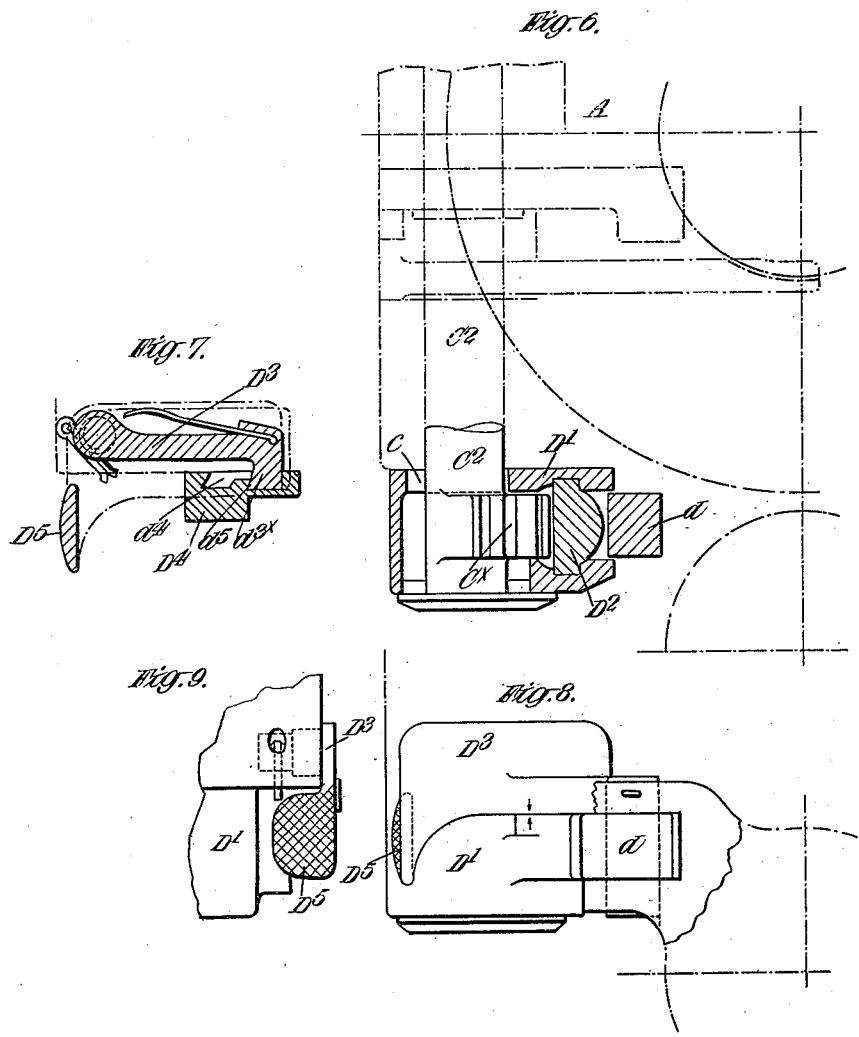

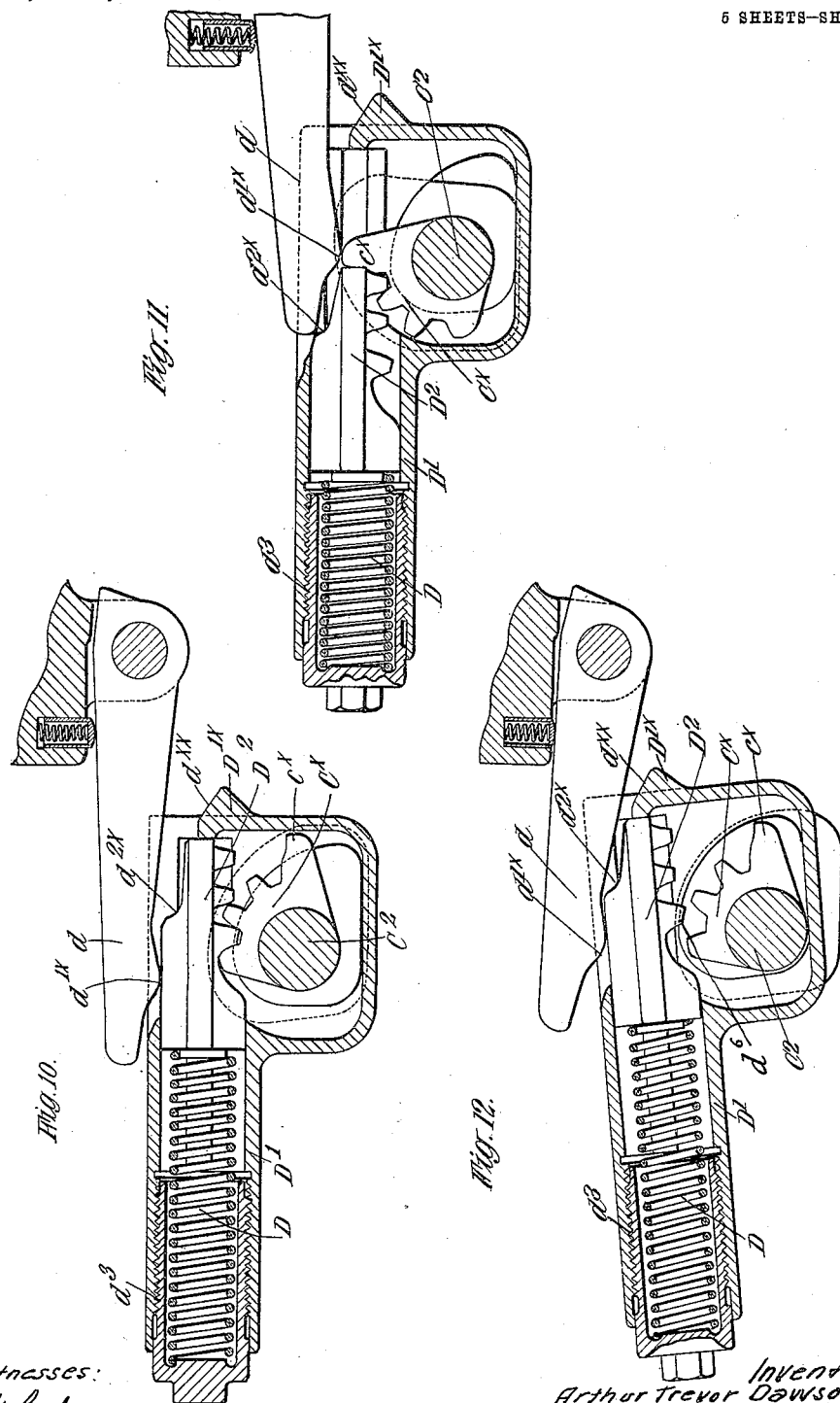

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, ENGLAND.

BREECH-LOADING ORDNANCE.

1,072,435.  Specification of Letters Patent.  Patented Sept. 9, 1913.

Application filed July 20, 1911. Serial No. 639,489.

*To all whom it may concern:*

Be it known that we, ARTHUR TREVOR DAWSON, knight, and GEORGE THOMAS BUCKHAM, both subjects of the King of Great Britain, residing at Vickers House, Broadway, Westminster, in the county of London, England, have invented certain new and useful Improvements in Breech-Loading Ordnance, of which the following is a specification.

This invention relates to breech loading guns of the semi-automatic type that can be readily converted at will into ordinary quick firing guns. In guns of this type we have proposed an arrangement which comprises a telescopic casing containing the helical actuating spring and having teeth for engagement with a toothed segment on the breech actuating spindle, the said casing also having a projection with which the hinged pawl engages to operate the casing and energize the spring until released by means of a tripping piece on the toothed segment. The reaction of the spring returns the casing to the original position and in so doing imparts motion to the toothed gearing and the breech actuating spindle.

According to our present invention we so devise the aforesaid arrangement that the spring case can be swung about a pivot to permit of its being set into a position suitable for the semi-automatic firing or for the quick firing of the gun, a suitable catch or the like being preferably provided for retaining the spring case in either of the positions to which it may be set.

In order that the said invention may be clearly understood and readily carried into effect, we will describe the same more fully with reference to the accompanying drawings, in which:—

Figure 1 is a rear elevation, and Fig. 2 a side elevation of the breech end of a gun provided with our improvements. Fig. 3 is a sectional side elevation, Fig. 4 an end elevation and Fig. 5 a plan of the semi-automatic gear. Fig. 6 is a section taken approximately on the line 1. 1. of Fig. 5. Fig. 7 is a section taken approximately on the line 2. 2. of Fig. 3. Figs. 8 and 9 are respectively a front and a side elevation of the spring catch for holding the case in the displaced position, and Figs. 10, 11 and 12 are horizontal sections taken approximately on the line 3. 3. of Fig. 3, showing the semi-automatic gear in three different positions.

A is the breech end of the gun, B the breech block, C the breech actuating hand lever and $C^2$ the actuating spindle.

$C^\times$ is the toothed segment carried by the spindle $C^2$, D is the helical actuating spring, D' is the spring case, $d$ is the spring controlled pawl and $D^2$ is the rack gearing with the toothed segment $C^\times$.

The spring case D' has a trunnion or pivot $d'$ (Figs. 3, 4 and 5) near its rear end by means of which it is connected to the underside of the breech end A of the gun. Curved projections $d^2$ struck from the center of the said trunnion $d'$ are provided near the forward end of the spring case D' for engagement with corresponding curved grooves in the gun, these grooves and projections serving as guides and imparting additional support to the spring case. Obviously the curved projections can be formed on the gun and the grooves in the spring case. The rear end of the spring case is provided with a screw-threaded hollow plug $d^3$ which serves as an adjustable abutment for one end of the helical spring D contained within the case D', the other end of the spring bearing against the toothed rack $D^2$ that is adapted to slide in grooves inside the said case. This rack engages with the toothed segment $C^\times$ which is carried by the breech actuating spindle $C^2$ and which may be similar to the toothed segment mentioned above, being provided with a tripping piece $c^\times$ that operates to release the pawl $d$ from the rack $D^2$ (as shown in Fig. 11) after the latter has received the requisite amount of movement or travel from said pawl to cause the breech block to assume the open position when the gun advances after recoiling. The aforesaid catch for retaining the spring case D' in its adjusted positions, is in the form of a spring controlled lever $D^3$ having at its inner end a nose $d^{3\times}$ (Fig. 7) to engage with one or other of two notches or recesses $d^4$, $d^5$ situated within a lug $D^4$ on the spring case; one of the said notches comes opposite the said nose $d^{3\times}$ when the spring case D' is moved into either of its adjusted positions. The said lever has an externally arranged thumb piece $D^5$ or the like for actuating it, so as to release its nose $d^{3\times}$ from engagement with the aforesaid notches or recesses $d^4$, $d^5$.

When the lever is in the disengaging position the spring case D' can be swung about its trunnion or pivot d' so as to bring it into the proper position for converting the working of the gun from the semi-automatic to the quick firing condition or vice versa.

Fig. 10 shows the case in the position for semi-automatic working, and Fig. 12 the position for quick firing, the spring case D' in the latter figure being displaced so that the rack $D^2$ is not in engagement with the toothed segment $C^x$. The hole $c$ in the case D' through which the spindle $C^2$ passes is elongated as shown in Figs. 5 and 6 to allow this movement to take place. Appropriate indications are provided as shown in Fig. 8 for enabling the operator to set the spring case D' into the required position for effecting the aforesaid conversion. The rack $D^2$ is formed at its end and on its inner surface with a depression, the end of the pawl $d$ engaging with the shoulder $d^{2x}$ formed by the said depression when the gun is working semi-automatically as shown in Figs. 10 and 11. The said pawl is formed with a protuberance $d'^x$ with which the tripping piece $c^x$ is adapted to engage as shown in Fig. 11 to disengage the pawl from the rack. The inner end of the case D' is formed with an extension $D'^x$ having an inclined surface $d^{xx}$ as shown in Figs. 10, 11 and 12. When the said case is set into the position shown in Fig. 12 for quick firing, the said inclined surface $d^{xx}$, the end of the rack and the shoulder $d^{2x}$ formed by the depression in the inner surface of the rack are substantially in line, so that during the run-out of the gun, the end of the pawl $d$ coöperates with the inclined surface $d^{xx}$ and the protuberance $d'^x$ passes over the rack without displacing the same during the completion of the run-out. When the spring case D' is in this position the tripping piece $c^x$ engages with the tooth $d^6$ (Fig. 12) of the rack $D^2$ during the final part of the opening movement of the breech, thus causing the spring D to act as a buffer for the breech block.

The handle $C^{xx}$ of the hand lever C is provided with a spring catch $c'$ (Figs. 1 and 2) having at its forward end two projections $c^2$, $c^3$ the former of which normally engages in a pocket in the gun and the projection $c^3$ remains out of engagement with a pocket $c^4$ in a member $c^5$ carried by the spindle $C^2$. The hand lever C is thus prevented from moving during the semi-automatic working of the gun. When the gun is working as a quick firer the act of grasping the handle $C^{xx}$ causes the catch $c'$ to be displaced and the projection $c^3$ to engage with the pocket $c^4$ in the member $c^5$. The projection $c^2$ being now out of engagement with the pocket in the gun, the hand lever C can be displaced to rotate the spindle $C^2$ and open and close the breech.

What we claim and desire to secure by Letters Patent of the United States is:—

1. In breech actuating mechanism, the combination of a toothed segment on the block actuating spindle, a toothed member engaging with said segment, a casing containing the actuating spring and the toothed member, an external hinged pawl adapted to energize the said spring, and means whereby the said casing can be swung into a position for the semi-automatic or quick firing actuation of the breech mechanism.

2. In breech actuating mechanism, the combination of a toothed segment on the block actuating spindle, a toothed member engaging with said segment, a casing containing the actuating spring and the toothed member, an external hinged pawl adapted to energize the said spring, and means for pivoting the said casing to the breech end of the gun.

3. In breech actuating mechanism, the combination of a toothed segment on the block actuating spindle, a toothed member engaging with said segment, a casing containing the actuating spring and the toothed member, an external hinged pawl adapted to energize the said spring, means for pivoting the said casing to the gun and a catch device for coöperating with the said casing.

4. In breech actuating mechanism the combination of a toothed segment on the block actuating spindle, a toothed member engaging with said segment, a casing containing the actuating spring and the toothed member and having recesses formed therein, an external hinged pawl adapted to energize the said spring, a trunnion on the said casing connected to the breech end of the gun, and a catch device for engaging with one or other of the recesses in the casing.

5. In breach actuating mechanism, the combination of a toothed segment on the block actuating spindle, a toothed member engaging with said segment, a casing containing the actuating spring and the toothed member, an external hinged pawl adapted to energize the said spring, means for pivoting the said casing to the gun, curved projections on the casing engaging in corresponding grooves in the gun, and a catch device for coöperating with the said casing.

6. In breech actuating mechanism, the combination of a toothed segment on the block actuating spindle, a toothed member engaging with said segment, a casing containing the actuating spring and the toothed member, an external hinged pawl adapted to energize the said spring, a trunnion on the said casing connected to the breech end of the gun, a lug on the said casing formed with two notches, and a catch device for engaging with one or other of the said notches.

7. In breech actuating mechanism, the combination of a toothed segment on the block actuating spindle, a toothed member engaging with said segment, a casing containing the actuating spring and the toothed member, an external hinged pawl adapted to energize the said spring, a trunnion on the said casing connected to the breech end of the gun, a lug on the said casing formed with two notches, a spring controlled lever, a thumb piece on the said lever and a nose on the said lever adapted to engage with one or other of the said notches.

8. In breech actuating mechanism, the combination of a toothed segment on the block actuating spindle, a casing containing the actuating spring, and a hinged pawl adapted to energize the said spring, a rack with which the said segment and the hinged pawl engage and means whereby the said rack can be moved out of engagement with the toothed segment.

9. In breech actuating mechanism, the combination of a toothed segment on the block actuating spindle, a casing containing the actuating spring, a hinged pawl adapted to energize the said spring, a rack with which the said segment and the hinged pawl engage, means whereby the said rack can be moved out of engagement with the toothed segment and a tripping piece on the toothed segment for disengaging the hinged pawl from the rack.

10. In breech actuating mechanism, the combination of a toothed segment on the block actuating spindle, a casing containing the actuating spring, a hinged pawl adapted to energize the said spring, a rack carried by the casing and engaging with said segment, a shoulder on the said rack with which the hinged pawl engages and means whereby the said rack can be moved out of engagement with the toothed segment.

11. In breech actuating mechanism the combination of a toothed segment on the block actuating spindle, a casing containing the actuating spring, a hinged pawl adapted to energize the said spring, a rack carried by the casing and engaging with the said segment, a shoulder on the said rack with which the hinged pawl engages, a tripping piece on the toothed segment, and a protuberance on the hinged pawl with which the tripping piece engages.

12. In breech actuating mechanism the combination of a toothed segment on the block actuating spindle, a casing containing the actuating spring, and a hinged pawl adapted to energize the said spring, a rack carried by the casing and engaging with the said segment, a shoulder on the said rack with which the hinged pawl engages, an inclined surface on the front of the casing, a tripping piece on the toothed segment and a protuberance on the hinged pawl with which the tripping piece engages.

13. In breech actuating mechanism the combination of a toothed segment on the block actuating spindle, a casing containing the actuating spring, and a hinged pawl adapted to energize the said spring, a rack carried by the casing and engaging with the said segment, a shoulder on the said rack with which the hinged pawl engages, an inclined surface on the front of the casing, a tripping piece on the toothed segment a protuberance on the hinged pawl with which the tripping piece engages, and a tooth on the rack with which the said tripping piece engages during the quick firing working of the mechanism.

In testimony whereof we affix our signatures in presence of two witnesses.

ARTHUR TREVOR DAWSON.
GEORGE THOMAS BUCKHAM.

Witnesses:
HENRY KING,
S. N. BROWN.

Copies of this patent may be obtained for five cents each, by addressing the "Commissioner of Patents, Washington, D. C."